(12) United States Patent
Wagner

(10) Patent No.: US 6,220,667 B1
(45) Date of Patent: Apr. 24, 2001

(54) PROCESS FOR ADJUSTING A VEHICLE SEAT

(75) Inventor: Peer-Oliver Wagner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/297,130

(22) PCT Filed: Oct. 22, 1997

(86) PCT No.: PCT/EP97/05845

§ 371 Date: May 26, 1999

§ 102(e) Date: May 26, 1999

(87) PCT Pub. No.: WO98/18648

PCT Pub. Date: May 7, 1998

(30) Foreign Application Priority Data

Oct. 25, 1996 (DE) ................................. 196 44 376

(51) Int. Cl.⁷ ...................................................... A47C 1/10
(52) U.S. Cl. ..................... 297/391; 297/284.6; 297/284.9
(58) Field of Search ............................... 297/284.1, 284.9, 297/284.4, 284.6, 391

(56) References Cited

U.S. PATENT DOCUMENTS

| | | | |
|---|---|---|---|
| 4,655,505 | * | 4/1987 | Kashiwamura et al. ........... 297/284.6 |
| 4,840,425 | * | 6/1989 | Noble ................................. 297/284.1 |
| 4,924,163 | * | 5/1990 | Sakamoto et al. ................. 297/284.9 |
| 5,127,708 | * | 7/1992 | Kishi et al. ........................ 297/284.9 |
| 5,170,364 | | 12/1992 | Gross et al. ........................... 364/558 |
| 5,263,765 | * | 11/1993 | Nagashima et al. ........... 297/284.9 X |
| 5,283,735 | * | 2/1994 | Gross et al. ................... 297/284.1 X |
| 5,320,409 | * | 6/1994 | Katoh et al. ........................ 297/284.6 |

FOREIGN PATENT DOCUMENTS

| | | |
|---|---|---|
| 38 43 624 | 7/1989 | (DE) . |
| 38 04 848 | 8/1989 | (DE) . |
| 42 37 072 | 12/1993 | (DE) . |
| 196 05 779 | 7/1996 | (DE) . |
| 0 489 310 | 6/1992 | (EP) . |
| 01240330 | 9/1989 | (JP) . |

* cited by examiner

*Primary Examiner*—Peter M. Cuomo
*Assistant Examiner*—Stephen Vu
(74) *Attorney, Agent, or Firm*—Evenson, McKeown, Edwards & Lenahan, P.L.L.C.

(57) ABSTRACT

An adjusting method for a vehicle seat having at least one seat component to which a drive is assigned as well as a pressure sensor in the seat component which interacts with the drive. The end of the adjustment is determined by a defined contact pressure of the user. The adjustment of the seat component is carried out in any starting position in an operating direction being a function of the contact pressure of the present user at the beginning of the adjustment determined by the pressure sensor.

11 Claims, 2 Drawing Sheets

PROCESS FOR ADJUSTING A VEHICLE SEAT

BACKGROUND OF THE INVENTION

The invention relates to an adjusting method for a vehicle seat via a drive wherein a seat component is movable throughout a range of positions, at least one pressure sensor arranged at or in the component and in controlling communication with the drive.

A method of this type is known in the case of a vehicle seat with a side wall adjustment from German Patent Document DE 196 05 779 A1. In that case, only the two seat side walls are adjusted upon an arbitrarily given switching command. Starting from a wide initial position, in which the two side walls are in their extreme position, they are moved toward one another upon the switching command until a defined contact pressure of the user is determined by an integrated pressure sensor. The side walls are then fixed in this position. The relevant switching value of the pressure sensor is always constant.

As a rule, such an adjustment takes place only once by the user at the beginning of the drive. The known method is based on the consideration that, relative to his body width, every user wants to be supported by means of the shaping-out and cushioning in the same manner in any driving situation. It is not provided that, starting from the then reached position, the side walls be adapted again to a new user or to the present user according to his desire. On the contrary, the preparatory adjusting of the starting position is required for this purpose.

The known adjusting method may be advantageous for the two seat side walls. Because of the described movement sequence, specifically the preparatory adjustment of the extreme position and the subsequent closing of the seat component to the desired position, the method cannot be applied to other seat components or can be applied only with a considerable loss of comfort. For example, if the seat back rest is considered, this back rest would first be situated in a position in which it is extremely tilted to the rear and would then have to be adapted to the respective user's requirements with respect to comfort, by a raising of the back rest.

Corresponding disadvantages also occur involving the longitudinal seat adjustment. The seat would be situated in an extreme position suitable for a tall vehicle user. A short vehicle user would have to be changed into the sitting position fitting him and would have to reach this position in a first try. If he were to exceed this position and therefore sit too closely to the steering wheel, he would have to go back into the initial position and then try to adjust his sitting position again.

SUMMARY OF THE INVENTION

It is an object of the invention to provide an adjusting method of the initially mentioned type which is also suitable for other seat components and which clearly improves the comfort.

The invention achieves this object by adjusting a seat component by starting with the seat component in an arbitrary starting position anywhere in the range of positions, sensing a contact pressure of an occupant of the seat via the at least one pressure sensor, comparing the sensed contact pressure with a predetermined desired contact pressure, adjusting the seat component from the arbitrary starting position directly in a direction such that the sensed contact pressure approaches the predetermined desired contact pressure, and terminating the adjusting step when the sensed contact pressure reaches the predetermined desired contact pressure.

The movement direction of the drive now depends on the actual necessity of changing the adjustment of the seat starting from the adjustment of the seat components for the previous user. Only those adjusting movements are still carried out which correspond to the difference between the adjustments for the previous and for the current user. Thereby the adjusting paths, as a rule, become significantly shorter than in the case of a closing movement from an extreme starting position.

Deviating from the initially mentioned document, the pressure sensor is also used for determining the adjusting direction of the drive. If the contact pressure at the beginning of the adjustment is higher than the pressure relevant to a comfortable adjustment, the drive is controlled into a direction which is opposite to the direction which the drive assumes in the case of a pressure which is lower than the comfortable contact pressure. In each case, the adjusting direction of the drive is such that the contact pressure is changed from the initial value, which is not equal to zero, in the direction of the comfortable contact pressure until it is equal to that value.

On the whole, the interaction between the drive, the seat component and the pressure sensor is completely different from that of German Patent Document DE 196 05 779 A1. There, the pressure sensor will block the drive at most if the contact pressure is equal to or higher than the pressure reached in the case of a comfortable side wall adjustment. Otherwise, the pressure sensor has no influence on the movement direction, particularly at the beginning of the adjustment.

As known per se from German Patent Document DE 196 05 779 A1, the end of the adjusting movement can be determined. by a defined contact pressure. The contact pressure is also determined by the pressure sensor.

However, as an alternative or in addition, the end of the adjustment can also be determined arbitrarily. The vehicle user is therefore permitted to adapt the adjustment of the seat components also subsequently according to his feelings of comfort.

For this purpose, it is known per se to activate the adjusting movement by means of a command generator. According to the invention, the adjusting movement is now carried out in a direction which depends on the ratio of the actual contact pressure determined by means of the pressure sensor to the contact pressure decisive for a comfortable seat adjustment. If the seat user wants to have the seat component adjusted into a position which is wider than the previous one, he only needs to increase the contact pressure on the seat component. The contact pressure will then be higher than the pressure for obtaining a comfortable seat adjustment. The drive will then be controlled into the "wider" direction. Inversely, he can also cause an adjustment of the seat component in the "narrower" direction in that he reduces the contact pressure and thereby generates a contact pressure which is lower than that needed for a comfortable seat adjustment.

For adaptations to users of very different body sizes, two pressure sensors may also be provided in the area of the back rest and are arranged above one another and operate selectively or jointly corresponding to the body size. By means of the contact pressure determined by means of the two pressure sensors, it can automatically be recognized whether a tall or a short vehicle user is involved and the effectiveness of the two pressure sensors can be switched correspondingly.

In the case of the method known from German Patent Document DE 196 05 779 A1, only the user's body width when the user first sits down is taken into account as an adjusting criterion. Changes of the body geometry, which occur particularly on longer drives and during longer stays in the seat, are not taken into account. In addition, the adjusting method is not suitable for carrying out a new adjustment of the vehicle seat components particularly during a drive. For this purpose, it would be necessary that the two components first take up their extremely wide position again in order to then close the two components again. This would result in a loss of the vehicle occupant's lateral support which takes place by means of the vehicle seat. Particularly an adaptation of the vehicle seat during a drive is therefore impossible in the case of the known method.

It is therefore another object of the invention to be able to adapt the vehicle seat component(s) to the actual comfort and safety needs of the vehicle occupant also during a drive.

This is achieved by the seat component is a back rest and at least two of the pressure sensors are arranged above one another in the back rest such that said at least two pressure sensors can be used to determine a height of an upper body of the occupant.

Two aspects are important in this case. On the one hand, the operating parameters of the vehicle are taken into account for the adjustment of the seat components. These are data concerning the driver's behavior, such as a calm or dynamic driving method, but also road influences, such as a flat road or an extremely sloping road, as well as the current driving situation, such as cornering or downhill driving. The seat components may be the seat side walls in the seat surface as well as lateral parts in the back rest or the back rest itself.

The second aspect relates to the type of the adjustment of the seat component. This seat component is now not adjusted such that a wide adjusting position is started in a preparatory manner. On the contrary, it is only determined by means of the output signal of the pressure sensor whether this output signal is above or below the switching value and the drive of the seat component takes place such that the output signal is adapted to the switching value by a targeted adjusting operation, that is, the adjustment in a single direction. If the output signal rises with a rising contact pressure and is lower (higher) than the switching value, the adjustment is carried out such that an increase (reduction) of the contact pressure and therefore of the sensor output signal takes place.

This opens up the possibility of being able to automatically carry out the adjustment also during a drive. A change of the lateral supporting force of the vehicle occupant which would reduce the safety of the vehicle occupant takes place in no phase of the adjustment. On the contrary, the adjustment of the vehicle seat always aims at increasing the vehicle occupant's safety.

As a rule, the information concerning the operating parameters of the vehicle is already present in various drive control units of the vehicle. The engine control unit and the transmission control unit should be mentioned here. Separately or in combination with one another, both units can supply the information required for adjusting the seat components. As a result, the lateral support of the vehicle occupant can be varied as a function of his driving behavior as well as the road influences and the driving situation.

As a result, it is also possible to carry out the adjustment of the seat component(s) in the event of an accelerated movement of the vehicle such that this adjustment counteracts the movement of the occupant caused by the acceleration.

The invention will be explained in detail by means of the drawing.

DETAILED DESCRIPTION OF THE INVENTION

Figure 1:
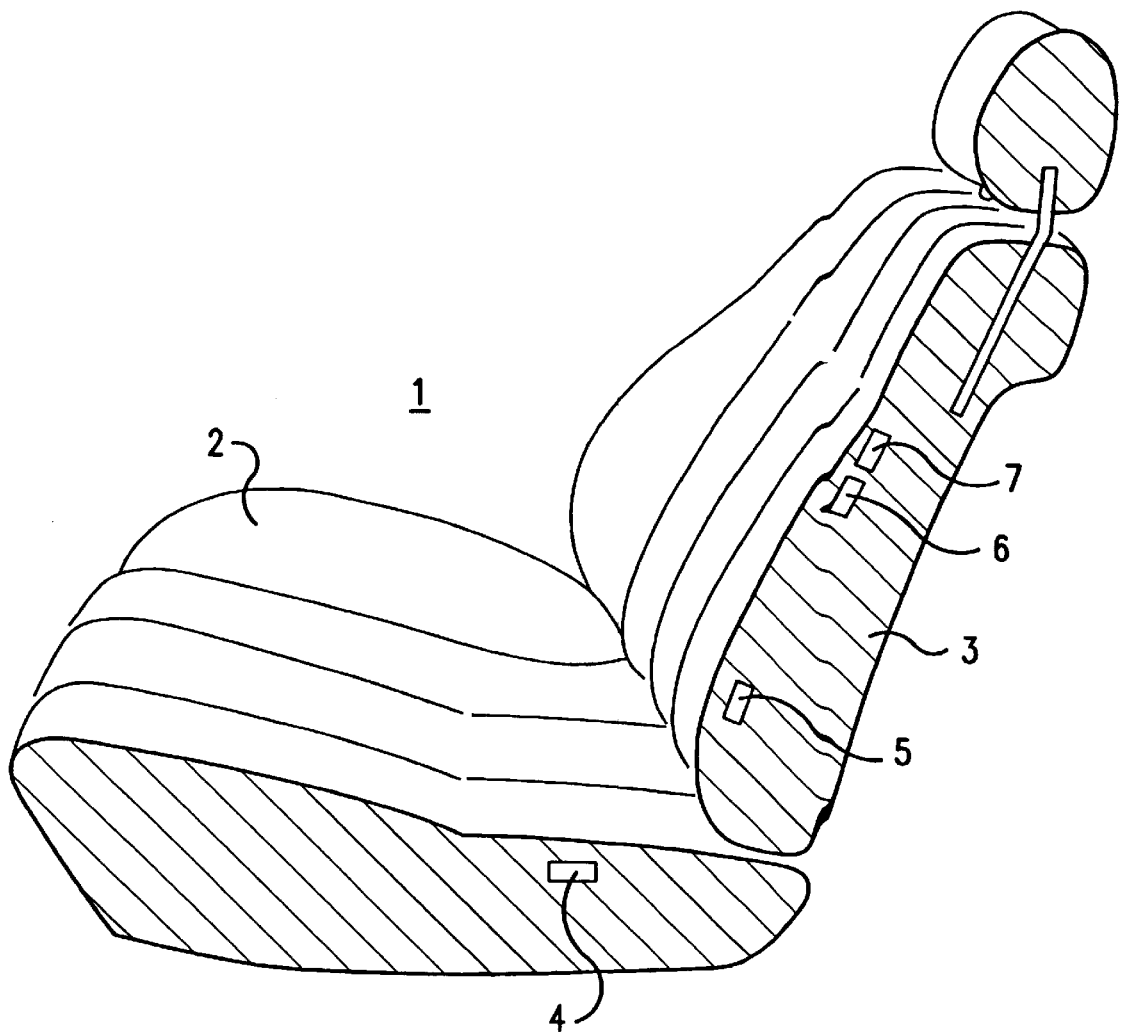
FIG. 1 is a view of a vehicle seat for explaining a first embodiment of the method according to the invention.

FIG. 1 is a sectional and a lateral view of a vehicle seat 1. In the area of the seat surface 2 as well as of the back rest 3, pressure sensors are arranged, of which four sensors 4, 5, 6, 7 are illustrated as examples.

In an adjusting mode, in which a switch is operated which is not shown, a correction of the adjustments of the parts of the vehicle seat 1 can be carried out by means of the signals supplied by the sensors 4 to 7. For this purpose, the contact pressure on the seat parts 2 and 3 is determined by means of the pressure signals supplied by the sensors (4–7) and by an analyzing circuit which follows and is not shown. If the contact pressure on the seat surface 2 is reduced during the adjusting mode in that the vehicle occupant raises his buttocks, this will be understood by the analyzing circuit as the vehicle occupant's desire to change the height of the seat surface 2 and thus increase the height of the seat as a whole.

Correspondingly, by means of the lower sensor or sensors in the back rest 3 (illustrated by means of the sensor 5) in the adjusting mode, the contact pressure onto the back rest is recognized and, in the event of an increase or decrease of this contact pressure, the vehicle occupant's desire to move the vehicle seat 1 farther to the rear or to the front is derived.

By means of the sensors 6 and 7, which are arranged above one another, the desire of a shorter or taller vehicle occupant can be recognized to bring the back rest into a more sloped or into an upright position.

The vehicle occupant's desire to correct the position of the different parts of the vehicle seat or to leave it unchanged can be achieved by means of adjusting elements, such as electric motors or the like, which are not shown, in an adjusting operation of the individual seat parts which follows the adjusting mode.

In this manner and without separate adjusting switches for the individual parts, the vehicle seat can be brought into the position desired by the vehicle occupant corresponding to his comfort and safety requirements.

Figure 2:
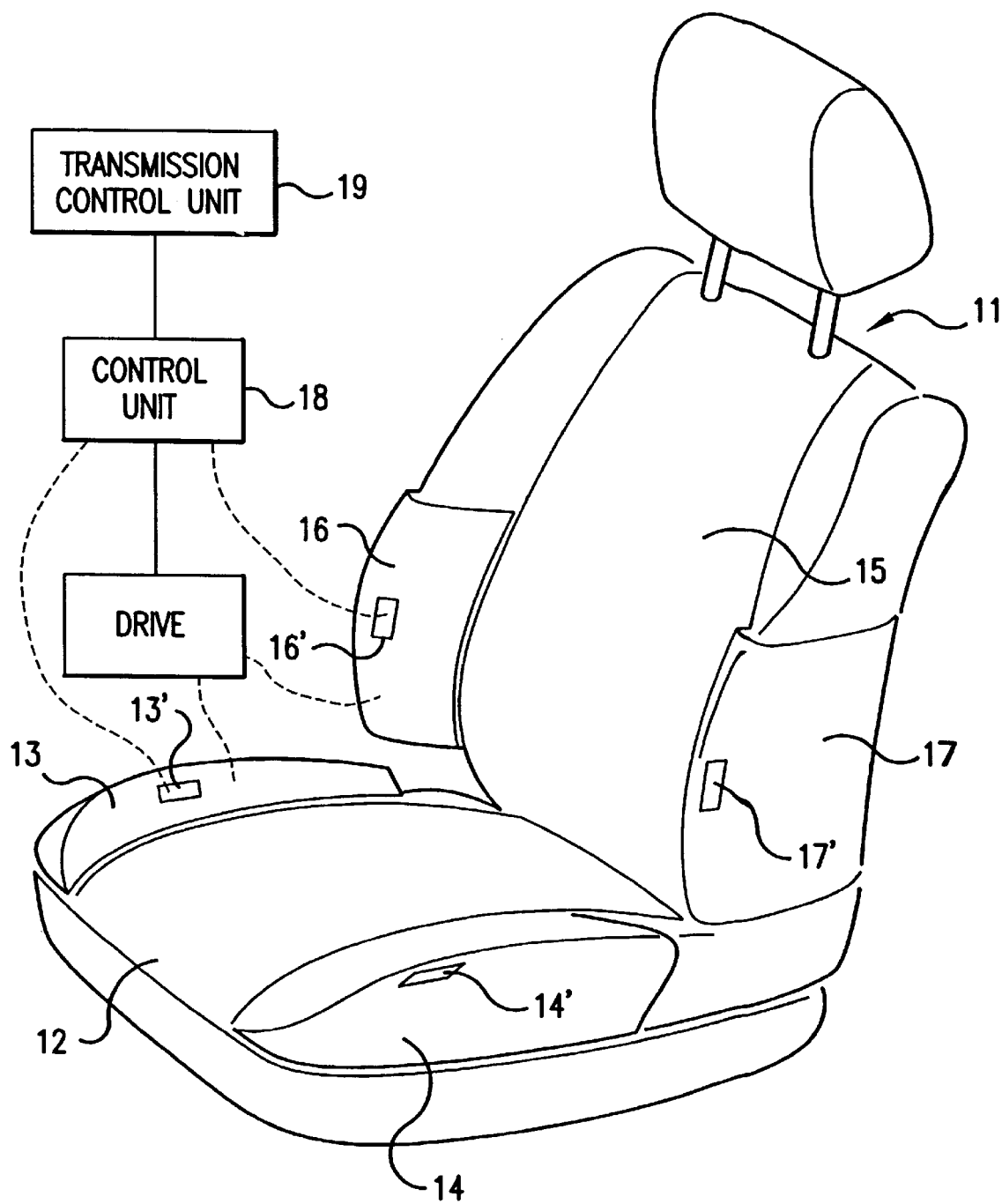
FIG. 2 is a view of another vehicle seat for explaining a second embodiment of the method.

FIG. 2 is a perspective view of a vehicle seat 11 with adjustable seat components. In its seat part 12, the vehicle seat 11 contains two adjustable seat side walls 13 and 14 in its seat part 12 and two lateral back rest parts 16 and 17 in its back rest 15. One pressure sensor 13', 14', 16' and 17' respectively as well as one drive respectively in the form of an electric motor, which is not shown, are integrated in the parts 13, 14, 16 and 17. The sensors 13', 14', 16' and 17' are connected with a control unit 18 which controls the driving motors. In addition, a transmission control unit 19 is connected with the control unit 18 and supplies information concerning the driver's behavior, road influences as well as the current driving situation.

Before the vehicle occupant enters the vehicle, the parts 13, 14, 16 and 17 are in the maximum open position. After the vehicle occupant has entered, the parts are brought into a position which provides the highest possible comfort to the vehicle occupant while the lateral supporting force is sufficient. The switching value for the switching-on and switching-off of the driving motors which is decisive for this purpose is relatively low with respect to a pressure-proportional output signal of the sensors 13', 14', 16' and 17'. The point in time for adjusting the parts 13, 14, 16 and 17 into their starting position is recognized, for example, automatically as the result of the starting of the internal-combustion engine.

If, after the start of the drive, the transmission control unit 19 now detects a sporty dynamic driving mode, the parts 13, 14, 15, 16 and 17 are automatically moved farther to the inside. The switching value of the pressure sensors decisive for this purpose is increased in comparison to the value decisive for the starting position. As the result of the automatic movement of the seat parts, the lateral supporting force for the vehicle occupant is raised and his safety is also increased.

If lateral accelerations during cornering or vertical accelerations during uphill and downhill drives are recognized also by means of the transmission control unit 19, the seat components are automatically and independently of one another adjusted such that the vehicle occupant's acceleration is counteracted. The switching value which is decisive for this purpose may be selected differently and corresponding to external conditions for each of the sensors 13', 14', 16' and 17'. Each of the seat components is adjusted such by a movement aligned only in one direction that the switching value of the assigned pressure sensor is reached as fast as possible.

The possibility is not shown of also providing a pressure sensor in the central back rest part, for example, in the region of the lordosis, by means of which pressure sensor in combination with a drive arranged in the back rest, the inclination of the back rest is varied corresponding to the operating parameters of the vehicle.

In a supplementary manner, it is also possible to take into account, in addition to the operating parameters, physiological characteristics of the vehicle occupant, such as his age, weight and the like and, as the age increases, pay more attention to the need for comfort by means of a correspondingly adapted adjustment of the seat components. The information concerning the physiological characteristics of the vehicle occupant can be transmitted to the control unit 8 by means of a chip card or the like, which contains these data and which transmits these data when the vehicle occupant enters the vehicle.

What is claimed is:

1. A method of adjusting a seat component of a vehicle seat via a drive, said seat component being movable throughout a range of positions, at least one pressure sensor being arranged at said seat component and being in controlling communication with said drive, said method comprising:

starting with said seat component in an arbitrary starting position anywhere in said range of positions;

sensing a contact pressure of an occupant of said seat via said at least one pressure sensor;

comparing said sensed contact pressure with a predetermined desired contact pressure; and adjusting said seat component from said arbitrary starting position directly in a direction such that said sensed contact pressure approaches said predetermined desired contact pressure; and terminating said adjusting step when said sensed contact pressure reaches said predetermined desired contact pressure.

2. The method according to claim 1, wherein said vehicle seat comprises a plurality of seat components, each of said seat components having a respective drive and at least one pressure sensor.

3. The method according to claim 1, wherein said seat component can be further adjusted arbitrarily by said occupant.

4. The method according to claim 1, wherein said seat component is a backrest, at least two of said pressure sensors being arranged above one another in said back rest such that said at least two pressure sensors can be used to determine a height of an upper body of the occupant.

5. The method according to one of claim 1, wherein a switching value of the pressure sensor is varied as a function of vehicle operating parameters.

6. The method according to claim 5, wherein the seat component is automatically adjusted.

7. The method according to claim 5, wherein the vehicle operating parameters are supplied by an engine control unit.

8. The method according to claim 5, wherein the vehicle operating parameters are supplied by a transmission control unit.

9. The method according to claim 5, wherein in the event of an accelerated vehicle movement, the adjustment of the seat component counteracts a movement of the occupant caused by the acceleration.

10. A system for adjusting a seat component of a vehicle seat, comprising:

a drive coupled to said seat component such that said seat component is movable throughout a range of positions;

at least one pressure sensor arranged at said seat component to sense a contact pressure of an occupant of said seat;

a control unit in communication with said at least one pressure sensor and said drive, said control unit comparing said sensed contact pressure with a predetermined desired contact pressure, said control unit adjusting said seat component from an arbitrary starting position anywhere in said range of positions directly in a direction such that said sensed contact pressure approaches and reaches said predetermined desired contact pressure.

11. A system for adjusting a seat component of a vehicle seat via a drive, said seat component being movable throughout a range of positions, said system comprising:

means for sensing a contact pressure of an occupant of said seat;

means for comparing said sensed contact pressure with a predetermined desired contact pressure; and means for adjusting said seat component from an arbitrary starting position anywhere in said range of positions directly in a direction such that said sensed contact pressure approaches and reaches said predetermined desired contact pressure.

* * * * *